United States Patent [19]

Delmaire

[11] Patent Number: 5,795,412
[45] Date of Patent: Aug. 18, 1998

[54] METHOD OF MANUFACTURING AND REPAIRING A BLADE MADE OF α-β TITANIUM

[75] Inventor: Raymond Delmaire, Othis, France

[73] Assignee: GEC Alsthom Electromecanique S.A., Paris, France

[21] Appl. No.: 777,732

[22] Filed: Dec. 20, 1996

[30] Foreign Application Priority Data

Dec. 22, 1995 [FR] France ................................. 95 15398

[51] Int. Cl.$^6$ .............................. B23K 20/22; C22F 1/18
[52] U.S. Cl. ..................... 148/524; 148/525; 148/527; 148/669; 228/262.71
[58] Field of Search ....................... 148/524, 525, 148/527, 669; 228/262.71

[56] References Cited

U.S. PATENT DOCUMENTS 5,448,828  9/1995  Willems et al. ...................... 29/899.1

FOREIGN PATENT DOCUMENTS

| 0240092A1 | 12/1987 | European Pat. Off. . |
| 2663343A1 | 12/1991 | France . |
| 1-200004 | 8/1989 | Japan . |
| 3-271352 | 12/1991 | Japan . |

OTHER PUBLICATIONS

*Patent Abstracts Of Japan*, vol. 013, No. 500 (M–891), 10 Nov. 1989 corresponding to JP–A–01–202389 (Hitachi Ltd) 15 Aug. 1989.

*Patent Abstracts Of Japan*, vol. 015, No. 403 (C–0875), 15 Oct. 1991 corresponding to JP–A–03–166349 (Fuji Electric Co. Ltd) 18 Jul. 1991.

*Patent Abstracts Of Japan*, vol. 013, No. 372 (C–627), 17 Aug. 1989 corresponding to JP–A–01–127652 (Hitachi Ltd) 19 May 1989.

*Primary Examiner*—George Wyszomierski
*Attorney, Agent, or Firm*—Sughrue, Mion, Zinn, Macpeak & Seas, PLLC

[57] ABSTRACT

A method of manufacturing a blade made of αβ titanium including an insert of metastable β titanium, according to the invention:

a blade body made of αβ titanium is made to the finished design dimensions, said blade body made of αβ titanium including a location designed to receive said insert made of β titanium;

said insert made of β titanium is put into solution; then hardening treatment is performed to harden said insert made of β titanium; then said insert made of β titanium is welded to said location of said blade body made of αβ titanium to the finished design dimensions using a welding technique having localized and controlled energy density.

11 Claims, 1 Drawing Sheet

FIG. 1
FIG. 2
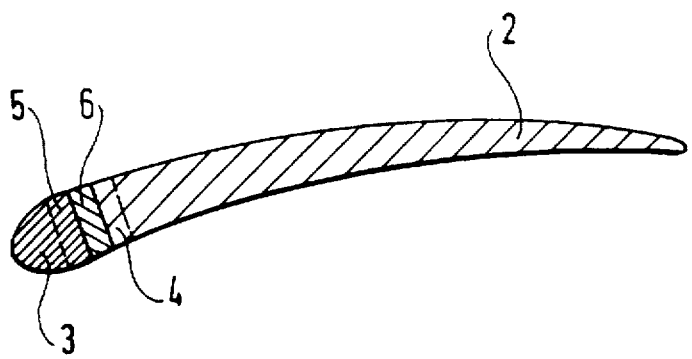

METHOD OF MANUFACTURING AND REPAIRING A BLADE MADE OF α-β TITANIUM

FIELD OF THE INVENTION

The present invention relates to a method of manufacturing a blade made of αβ titanium and including an insert of metastable β titanium, and also to a blade made by such a method.

The invention relates more particularly to a method of manufacturing a turbine blade made of αβ titanium including an anti-erosion protective insert made of metastable β titanium mounted and welded on the leading edge of said blade.

BACKGROUND OF THE INVENTION

The need to increase the capacity of steam turbines has led manufacturers to increase the length of turbine blades. Initially, the increase had been limited by the centrifugal force developed by the inertia of the rotating blades. The material used was a high density steel having 12% chromium.

To push back that limitation, manufacturers have been using αβ titanium which has substantially the same mechanical characteristics as 12% chromium steel, but whose density is half that of 12% chromium steel. Thus, for given length, a blade made of αβ titanium develops a centrifugal inertia force which is significantly lower than that of a blade made of 12% chromium steel, so longer blades are possible whilst remaining within the limits of the mechanical characteristics of αβ titanium.

Such large-sized blades are used in particular in the low pressure stage of steam turbines. As a result, the leading edges of the blades suffer from erosion due to drops of driving fluid passing thereover. To mitigate said erosion, the leading edges of the blades are generally provided with protection against erosion.

For blades made of 12% chromium steel, a steel of the "Stellite" type may be used (trademark filed by "Higness Stellite Division" of Union Carbide Corporation), or Mf quenching may be performed on the leading edge.

In the case of blades made of αβ titanium, an insert of metastable β titanium is used, mounted on the leading edge of the blade.

On being put into solution, then welded to the αβ titanium, and finally subjected to hardening treatment, β titanium suffers from a change of structure during the last step which causes considerable deformation of the assembly. As a result the blade twists or warps and therefore no longer complies with the design dimensions.

JP-A-4-63902 relates to a method of manufacturing a part made of αβ titanium including an insert of metastable β titanium. The method mitigates the above drawback by proposing a blade blank made of αβ titanium which still has a machining margin to which the β titanium insert is welded, and then the assembly is subjected to the hardening treatment. In a subsequent step, because of the machining margin, the blank can be rectified to the design dimensions so as to correct the deformations resulting from the hardening treatment.

The costs generated by that solution are increased by the two machining operations. Furthermore, a blade made by that method cannot be reconditioned when the anti-erosion insert is worn. Finally, certain large-sized blades cannot be obtained by machining means. Those blades are obtained by precision forming directly to the finished design dimensions. Thus the method using extra thickness can no longer be used.

JP-A-62-170464 relates to a method of manufacturing a part made of αβ titanium comprising an insert of metastable β titanium. In that method a TIG welding technique is used with pure titanium as welding material. Apart from the fact that it requires another material, TIG welding thermally affects a large zone of the αβ titanium and of the metastable β titanium. This results in welding of very low hardness at the interface between the αβ titanium and the pure titanium used for the welding, in the pure titanium itself, and between the metastable β titanium and the pure titanium used for the welding.

JP-A-1-200004 relates to a method of manufacturing a part made of αβ titanium including an insert of metastable β titanium. In that method, the welding technique is of the electron beam type, but that document teaches that for welds of width greater than 3 mm the thermally-affected zones are large, and the part is subject to large amounts of deformation.

OBJECTS AND SUMMARY OF THE INVENTION

The object of the present invention is to propose a method of manufacturing a blade made of αβ titanium including an insert of metastable β titanium which substantially improves the prior methods by substantially reducing deformation of the blade during manufacture, and produces a weld presenting hardness lying between the hardness of the αβ titanium and the hardness of the metastable β titanium.

To this end the invention provides a method of manufacturing a blade made of αβ titanium including an insert of metastable β titanium, wherein:

a blade body made of αβ titanium is made to the finished design dimensions, said blade body made of αβ titanium including a location designed to receive said insert made of β titanium;

said insert made of β titanium is put into solution; then hardening treatment is performed to harden said insert made of β titanium; then said insert made of hardened β titanium is welded to said location of said blade body made of αβ titanium to the finished design dimensions using a welding technique having localized and controlled energy density.

According to another characteristic of the invention, welding stress is relieved by stress-relieving heat treatment.

By way of non-limiting example, the welding technique is electron-beam welding or laser welding.

The weld fillets are abraded.

Advantageously, the αβ titanium is a TA6V.

Advantageously, the metastable β titanium is a TA5D4Zr4CEF.

In a preferred embodiment:

the metastable β titanium is put into solution by a heating step at 860° C. for one hour, followed by oil quenching;

the metastable β titanium is hardened at 550° C. for one hour under a flow of argon;

welding is performed under helium; and the stress-relieving heat treatment takes place at 550° C. for one hour under a flow of argon, followed by cooling under argon.

The insert is made to the finished design dimensions either before or after the welding step.

The invention also provides a method of repairing a steam-turbine blade manufactured as described above, and having a worn anti-erosion insert. According to the invention:

said blade is machined to eliminate the remains of the worn anti-erosion insert, and a new anti-erosion insert is treated and welded by application of the steps of the above-described method.

Finally, the invention provides a steam-turbine blade including an anti-erosion insert, manufactured or repaired according to the above-described methods.

A first advantage of the present invention results from the metastable β titanium being hardened prior to the welding step. This prevents the blades from warping during heat treatment after welding.

Since heat treatment after welding is possible, welding stresses can be relieved so that the welds present hardness increasing from that of αβ titanium to that of metastable β titanium.

The possibility of changing a worn anti-erosion insert on a blade constitutes another advantage.

BRIEF DESCRIPTION OF THE DRAWING

Other advantages and characteristics of the present invention appear from the following description given with reference to the accompanying drawing, in which:

FIG. 1 is a diagrammatic view of a steam-turbine blade made by the method of the invention; and FIG. 2 is a diagrammatic cross-section view of a steam-turbine blade made by the method of the invention.

MORE DETAILED DESCRIPTION

In the method of the invention, a steam-turbine blade 1 is manufactured that comprises a blade body 2 made of αβ titanium and an insert 3 made of metastable β titanium. The insert 3 made of metastable β titanium is located on the leading edge of the blade, and its function is to protect the leading edge against erosion due to droplets of water present in the steam-turbine.

The method of manufacturing a blade made of αβ titanium including an insert of metastable β titanium comprises the following steps:

the blade body 2 made of αβ titanium is made to the finished design dimensions, and a location for receiving said insert 3 made of β titanium is provided;

said insert 3 made of β titanium is put into solution; then hardening treatment is performed to harden said insert 3 made of β titanium; then said insert 3 made of β titanium is welded to said location of said blade body 2 made of αβ titanium to the finished design dimensions using a welding technique having localized and controlled energy density.

The term "welding technique having localized and controlled energy density" is used herein to designate a technique which does not make use of welding material other than the αβ titanium of the blade and the metastable β titanium of the insert, and in which the thermally-affected zones 4 and 5 respectively of the αβ titanium and of the metastable β titanium, and also the melt zone 6 are all small in size.

Such a welding technique is, for example, electron-beam welding or laser welding.

The hardening step prior to the welding step is an important characteristic of the present method. In this way, structural changes to the metastable β titanium are completed before the welding step, and any additional heat treatment of the blade together with its insert, subsequent to the welding step, will not affect the assembly.

Advantageously, stress-relieving heat treatment is performed for relieving welding stress after the welding step. This step allows the mechanical characteristics of the melt zone and the thermally-affected zones to be raised.

In a non-limiting implementation, the a αβ titanium is a TA6V, the metastable β titanium is a TA5D4Zr4CEF, and the characteristics of the method are as follows:

the metastable β titanium put into solution by a heating step at 860° C. for one hour, followed by oil quenching;

the metastable β titanium is hardened at 550° C. for one hour under a flow of argon;

welding takes place under helium; and the stress-relieving heat treatment takes place at 550° C. for one hour under a flow of argon, followed by cooling under argon.

Table 1 below shows Vickers hardnesses of the blade manufactured by implementing the invention.

TABLE 1

|  | $HV_{1C}$ |
|---|---|
| TA6B | 325 |
| TAZ TA6V | 375 |
| Melt Zone | 465 |
| TAZ TA5D4Zr4CEF | 500 |
| TA5D4Zr4CEF | 510 |

Table 1 shows that the hardness of the blade is a monotonically increasing function between the blade body made of TA6V and the insert 3 made of TA5D4Zr4CEF. Furthermore, it is remarkable that the thermally-affected zones (TAZ) and the melt zone do not constitute points of low hardness as in the prior art.

Traction tests have also been carried out with test pieces taken from a blade manufactured by implementing the invention.

A first set of test pieces was taken from the TA5D4Zr4CEF, and the average value obtained was 1550 MPa.

A second set of test pieces was taken from the TAZ 4 and 5, and from the melt zone 6, and the average value obtained was 1020 MPa, breakage taking place in the TAZ of the TA6V.

A third set of test pieces was taken from the TA6V, and the average value obtained was 960 MPa.

Again, a continuous monotonically increasing function can be observed between the TA6V and the TA5D4Zr4CEF.

The invention also relates to a method of repairing a steam-turbine blade 1 manufactured by the abovedescribed method and having a worn anti-erosion insert.

In this repair method:

said blade 1 is machined to eliminate the remains of the worn anti-erosion insert, and a new anti-erosion insert is treated and welded by the steps of the above-described method.

Finally, the invention relates to a steam-turbine blade 1 comprising an anti-erosion insert, manufactured or repaired by one of the methods of the invention.

Naturally, the invention is not limited to the embodiment described and shown, but is capable of numerous variations accessible to the person skilled in the art without departing from the invention. In particular, the titanium-based alloys used could be replaced by other titanium-based alloys without going beyond the ambit of the invention.

I claim:

1. A method of manufacturing a blade made of αβ titanium including an insert of metastable β titanium, comprising:

providing a blade body comprising αβ titanium of finished design dimensions, said blade body including a location designed to receive said insert of β titanium; placing said insert of β titanium into solution; then carrying out a hardening treatment to harden said insert of β titanium; then
welding said insert of β titanium to said location of said blade body, using a welding technique having localized and controlled energy density.

2. A method according to claim 1, further comprising relieving welding stress by stress-relieving heat treatment.

3. A method according to claim 2, wherein:
said placing step comprises putting the metastable β titanium into solution by a heating step at 860° C. for one hour, followed by oil quenching;
said hardening treatment comprises hardening the metastable β titanium at 550° C. for one hour under a flow of argon;
said welding is performed under helium; and
the stress-relieving heat treatment takes place at 550° C. for one hour under a flow of argon, followed by cooling under argon.

4. A method according to claim 1, wherein the welding technique is electron-beam welding.

5. A method according to claim 1, wherein the welding technique is laser welding.

6. A method according to claim 1, wherein the αβ titanium is a T-A6V.

7. A method according to claim 1, wherein the metastable β titanium is a TA5D4Zr4CEF.

8. A method according to claim 1, comprising forming weld fillets and abroding said weld fillets.

9. A method according to claim 1, wherein the insert is made to its final dimensions before the welding step.

10. A method according to claim 1, wherein the insert is made to its final dimensions after the welding step.

11. A method of repairing a steam-turbine blade made of αβ titanium and having a worn anti-erosion insert, comprising:
machining said blade to eliminate the remains of the worn anti-erosion insert, and
providing a new anti-erosion insert by:
placing an insert of β titanium into solution; then
carrying out a hardening treatment to harden said insert of β titanium; then
welding said insert of β titanium to the location on the blade where the worn anti-erosion inset had been, using a welding technique having localized and controlled energy density.

* * * * *